Sept. 23, 1958 W. W. LOOSE 2,853,305

PHONOGRAPH APPARATUS

Filed March 10, 1955

INVENTOR.
WINFIELD W. LOOSE
BY
Carl H. Synnestvedt
AGENT

United States Patent Office 2,853,305

Patented Sept. 23, 1958

2,853,305

PHONOGRAPH APPARATUS

Winfield W. Loose, Reading, Pa., assignor to Philco Corporation, Philadelphia, Pa., a corporation of Pennsylvania Application March 10, 1955, Serial No. 493,483

8 Claims. (Cl. 274—10)

The present invention relates to phonograph apparatus and particularly to automatic phonograph record changers in which records are supported above the turntable and dropped one at a time into playing position over the turntable.

More specifically the invention herein disclosed and claimed has to do with spindle adapters for permitting the playing and automatic changing of records of the type having a central aperture which has a diameter considerably larger than the diameter of the customary vertically extending spindle usually associated with a phonograph turntable.

It is an object of the present invention to provide a record supporting and dropping spindle adapter of the above-mentioned variety which positively insures that only the lowermost record in a supported stack will drop during each successive record-changing cycle.

It is also an object of the invention to construct a record supporting and dropping spindle device in such a manner that the lowermost record in a supported stack is effectively separated from the remaining records in said stack by means of a simplified blade-operating mechanism.

A characteristic feature of the invention resides in the provision of a record supporting and dropping structure in which the supported records serve, in cooperation with simple sliding elements, to effect separation of the lowermost record so that proper successive dropping of single records from a supported stack is made possible without having recourse to intricate mechanical driving means.

Although capable of broader application, the record supporting and dropping arrangement constructed in accordance with this invention is especially useful when employed with automatic record changing phonographs of the variety in which supported records are successively released through a tilting or "nodding" motion of the record supporting spindle as is described, for example, in the Tourtellot patent, No. 2,676,805 dated April 27, 1954.

Briefly stated and in accordance with a broader aspect of the present invention, the above-noted general objects and characteristic features are achieved by utilization of a two-part arrangement for supporting and dropping records, one of said parts being in the form of a tilting or nodding spindle structure extending from the center of a phonograph turntable and adapted to support records adjacent their central aperture, the other of said parts being in the form of a rigid shelf structure mounted to the side of the turntable and adapted to support records adjacent their marginal edge. The spindle structure is provided with a projecting depressible side piece associated with a retracted projectable blade device for separating the lowermost record, and the shelf structure is provided with a fixed abutment or stop to prevent lateral movement of the lowermost record in response to the tilting or nodding motion of said spindle structure so that the lowermost supported record depresses said side piece and thereby actuates said blade device to separate said lowermost record from record immediately above it.

In accordance with a narrower aspect of the invention the spindle structure is constructed as a spindle adapter unit which accommodates records having the larger central aperture and which removably fits over the customary spindle designed to accommodate records having the smaller central aperture. In this manner the same phonograph may be used to play either of the mentioned two types of records by simply placing the adapter unit on or removing it from said customary spindle.

The full nature of the invention will be more clearly understood from the following description taken in conjunction with the accompanying drawing, in which.

Figure 1:
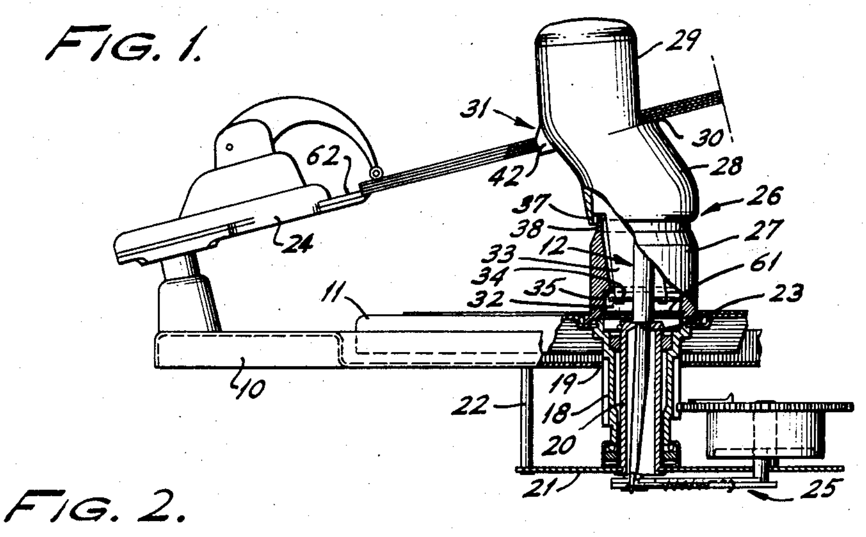
Figure 1 is a fragmentary elevational-sectional view of an automatic record-changing phonograph provided with a spindle device constructed in accordance with the invention.

With more particular reference to the drawings, the phonograph, as shown in Figure 1, includes a mounting panel or base plate 10 which serves to carry the various parts. A turntable 11 is rotatably mounted on the panel and is adapted to support records during the playing thereof. The turntable may be driven by means of the usual well-known motor-idler assembly not shown.

Figure 2:
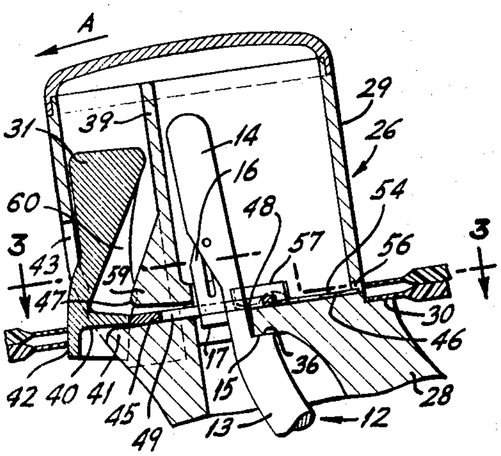
Figure 2 is an enlarged vertical cross-sectional view of the upper portion of the spindle device and illustrates the operative parts thereof in their record supporting position.
Figures 4, 5:
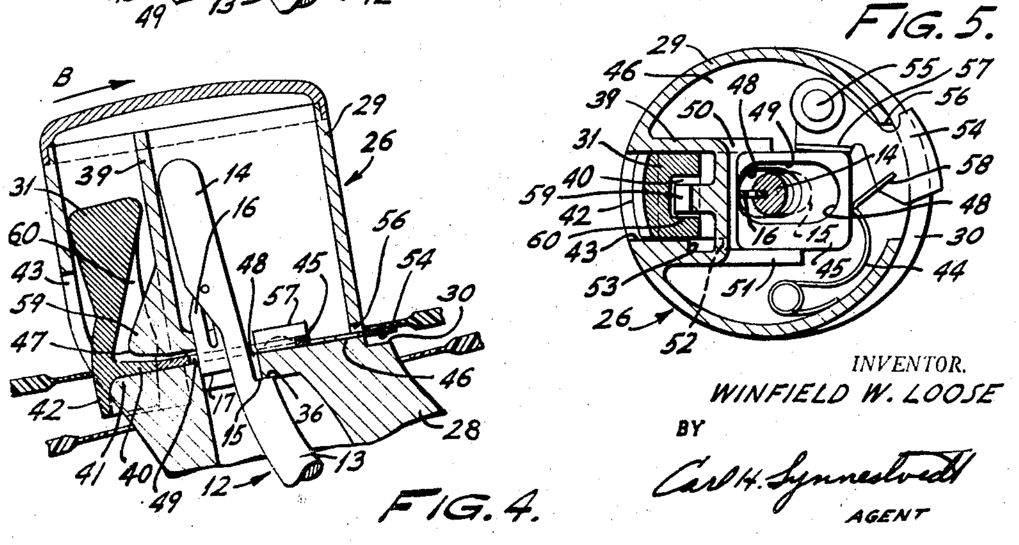
Figure 4 is a view similar to Figure 2 but illustrates the operative parts in their record separating and discharging position.
Figure 5 is a view similar to Figure 3 but illustrates the parts in the position shown in Figure 4.

As previously stated, the phonograph is of the type in which a stack of records is supported above the turntable and the records are successively dropped into playing position over the turntable. In order that records of the type having the smaller central aperture may be played on the phonograph, the turntable 11 is provided with a suitable center spindle having a diameter corresponding to the diameter of said smaller aperture. Such a spindle is represented at 12 and, as seen in Figures 2 and 4, includes an upper bent or curved portion 13 terminating in an offset extension 14 which provides an inclined shoulder 15 and which is supplied with a side piece 16 providing a second shoulder 17 disposed opposite the shoulder 15 and above the latter at a distance slightly greater than the thickness of a record.

The manner in which the spindle 12 is mounted is shown in Figure 1. As seen in this figure, the turntable is provided with an axially disposed tubular hub 18 which passes through an opening 19 in the mounting panel 10 and which is concentric with and rotatable on an upright tubular axle 20. This axle is fixedly supported on a bracket or bridge 21 which is rigidly suspended from the mounting panel by means of posts, such as the one illustrated at 22. As can be seen in Figure 1, the spindle 12 is received in said axle 20 and is held in position by means of an abutment 23 in engagement with the upper extremity of the axle 20.

This interengagement of the spindle 12 with the axle 20 provides a pivot about which said spindle is free to rock toward and away from a record-supporting structure 24. This rocking movement of the spindle takes place during a record-changing cycle and is controlled by means of a lever-and-cam mechanism designated in its entirety by the reference numeral 25. The details of this mechanism need not be described inasmuch as they are not necessary to complete understanding of the present invention. Moreover the construction and the function of such a mechanism are known and will be clearly understood by referring to the aforesaid Tourtellot patent.

In particular accordance with the present invention a spindle adapter 26 is constructed to slip over the turntable spindle 12 and to become operatively associated therewith whenever it is desired to play records having the larger central aperture. As illustrated, the spindle adapter 26 consists of a lower portion 27 and an upper portion 28. The lower portion 27 has the form of a hollow straight cylinder and constitutes a base which frictionally engages the turntable 11 to rotate therewith. The upper portion 28 is in the general form of an elongated hollow curved cylinder having an outer surface configuration which substantially corresponds to the shape of the turntable spindle 12, in that said curved cylinder or portion 28 terminates in an offset extension 29 providing an inclined record supporting shoulder 30 which, as best seen in Figure 1, is disposed in an elevated position on one side of the spindle structure or adapter 26. Moreover said portion 28 is provided with an elongated side piece 31 disposed on the side of said spindle structure which is opposite to the side on which the shoulder 30 is located.

As seen in Figure 1, the two portions 27 and 28 are loosely interconnected so as to move freely with respect to each other. For that purpose the base or lower portion 27 is provided with a recess 32 into which an extended lower part 33 of the upper portion 28 projects. This extended lower part 33 carries a cross member 34 which underlies an internal flange 35 defined by said recess 32. In this manner, the lower portion 27 and the upper portion 28 are free to move independently but are prevented from becoming disassociated.

Figure 3:
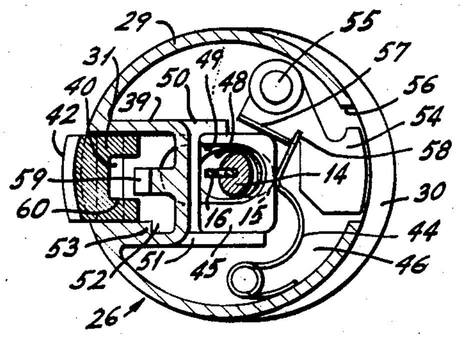
Figure 3 is a cross-sectional view which is taken substantially on line 3—3 of Figure 2, but in which representation of the supported records has been omitted for clarity of illustration.

The upper portion 28 is adapted to be suspended in floating position with respect to the base or lower portion 27 and is also adapted to tilt or nod with respect to said base or lower portion. To provide for the suspension of the upper portion 28 there is provided a ledge 36 which, as seen in Figures 2 and 3, is formed on the inside surface of said upper portion and which is disposed for engagement by the shoulder 15 of the turntable spindle to support said upper portion just above the base or lower portion 27 and in a position in which the side piece 31 confronts the shelf structure 24 (Fig. 1). To permit the tilting or nodding motion of the upper portion 28, the edge of the cross member 34 (Figure 1) is spaced from the adjacent wall of recess 32 at a distance sufficient for said movement. Moreover in order to insure against disassociation of said portions 27 and 28 as a result of movement of the upper portion 28 to tilted position, a downwardly projected skirt 37 (Figure 1) is formed on said upper portion and overlaps an upwardly directed lip 38 on the lower portion 27. Said skirt and lip are sufficiently spaced from each other to allow for said tilting motion while serving as a stop to prevent said portions from slipping out of proper relationship.

As shown in the drawing, the adapter portion 28 is provided with an internal U-shaped channel 39 which extends vertically and which loosely receives the elongated side piece 31 so that the latter is free to slide in said channel both in longitudinal and transverse directions with respect to said adapter portion. Downward gravitational sliding movement of the side piece is limited by means of an abutment 40 which is disposed crosswise and inwardly of said piece and comes to rest on a projection 41 provided on the adapter portion 28, so that a lower end portion 42 of said side piece becomes properly located with respect to the shoulder 30 of said adapter portion.

In order to urge the side piece 31 to the position shown in Figures 2 and 3 in which position the mentioned portion 42 of said side piece projects outwardly from the exterior surface of the adapter portion 28 through an opening 43 in the latter, there is provided a spring element 44 disposed to bear resiliently on one end of a slide member 45, the other end of which engages the edge of the abutment 40 of said side piece. The slide member 45 rests on a flat surface portion 46 provided within the adapter portion 28 and extends into a slot 47 cut through the wall of the channel 39, said flat surface portion and said slide member having registering apertures 48 and 49 to permit passage of the upper portion or extension 14 of the spindle 12. These apertures are elongated, as best seen in Figs. 3 and 5, to allow reciprocating movement of said slide member without interference from said spindle 12.

As also seen in Figures 3 and 5, a pair of raised ribs 50 and 51 on the flat surface 46 engage opposite sides of the slide member 45 to guide the latter in its reciprocating motion. A shoulder 52 is formed on said slide member to engage a corresponding shoulder 53 on the adapter portion 28, said shoulders cooperating to arrest the slide member and to limit its outward movement under action of the spring element 44.

A record separating blade 54, pivoted as at 55 to the flat surface portion 46, is adapted to swing in and out of the adapter portion 28 through a slit 56 cut through the wall of said adapter portion and located above the record supporting shoulder 30 at a distance slightly greater than the thickness of a record. As illustrated in Figs. 3 and 5, swinging motion of said blade is advantageously accomplished in response to the reciprocating movement of the slide member 45. For that purpose the blade member 54 is conveniently provided with a flange 57 disposed in engagement with a corner portion of said member and, as shown in Fig. 3, said blade is normally urged to retracted position within the spindle portion 28 and is resiliently held in engagement with said corner portion of the slide member, as by means of an extension 58 of the spring element 44 associated with said member.

As best appear in Figs. 2 and 4, a projection 59 is provided on the adapter portion 28 within the channel 39 and is disposed to extend into a recess 60 at the rear portion of the side piece 31, said projection and recess cooperating to stabilize said side piece during its sliding movements inwardly of said adapter portion.

As illustrated in Figure 1, the open bottom end of the spindle adapter is conveniently closed by means of an apertured plate 61 which is suitably retained in place on the base or lower portion of said adapter and through which the turntable spindle 12 passes into the spindle adapter.

In using the spindle adapter on an automatic phonograph in the manner above described, records having the larger central aperture are stacked on said adapter, the center of the stacked records being supported by the inclined shoulder 30, and the edge of said records being supported by the side shelf structure 24. Upon reference to Figure 1, it will be noted that when the records are stacked on the spindle adapter 26, the marginal edges of the central apertured portions of the supported records lie adjacent the laterally projecting portion 42 of the side piece 31. In this manner when the lever-and-cam mechanism 25 operates to tilt the turntable spindle 12, the upper portion 28 of the spindle adapter 26 is moved in the direction indicated by the arrow A in Figure 2, and the lowermost record, which bears against a stop 62 on the shelf or supporting structure 24, causes said side piece 31 to move inwardly of said adapter portion 28. This inward movement of the side piece 31 imparts motion to the slide member 45 against the spring element 44, said slide member in turn causing the blade 54 to pivot outwardly to the position shown in Figures 4 and 5. As seen in Figure 4, this outward movement of the blade 54 causes it to enter between the lowermost record and the record immediately above it. The lowermost record is thus separated from the remainder of the supported stack, so that when the upper portion 28 of the adapter unit 26 reaches the position where the shoulder 30 is brought into registry with the central aperture of said lowermost record, the latter clears said shoulder and drops below the level thereof while the blade 54 maintains the remaining records in their suspended position.

Upon actuation of the turntable spindle 12, in the direction shown by arrow B in Figure 4, to return the adapter unit portion 28 to its initial position shown in Figure 2, the pressure imposed on said side piece 31 and on the slide member 45 is released and the spring element 44 acts on said member to move said side piece from the position shown in Figures 4 and 5 back to the position shown in Figures 2 and 3. During this latter movement of the side piece 31 and slide member 45, the spring portion or extension 58 acts on the blade 54 to retract the same to its inner position so that the center of the supported record stack again seats on the shoulder 30 and the next record, which then becomes the lowermost record, is ready to be released during the next succeeding record changing cycle.

It is noted that in the position shown in Figure 5, the spring extension 58 is moved for an appreciable distance from the flange 57 of the blade 54. This feature has the advantage that the spring 44 acts on the slide member 45 to return the portion 42 of the side piece 31 to its record engaging position prior to retracting the blade 54 from under the suspended records. In this manner the danger of dropping records during the return motion of the adapter unit, is positively prevented.

It will be appreciated that because of the slidable mounting of the side piece 31 in the guiding channel 39, records which rest on the turntable 11 may be manually removed therefrom and withdrawn along the length of the adapter unit 26, it being understood that the records coming in contact with the side piece 31 lift the same and cause protruding portion 42 to move inwardly of said adapter. During the playing of a record the base or lower portion 27 of the adapter rotates with the turntable 11 and thus offers no frictional resistance to free rotation of the record being played.

Whenever it is desired to play conventional records having the smaller central aperture, the spindle adapter 26 is lifted off the turntable spindle 12 which then becomes available to support a stack of conventional records and to release the same successively, through tilting or nodding motion of said spindle in the manner previously described.

From the foregoing description it will be appreciated that a removable spindle adapter constructed in accordance with the present invention insures adequate support and proper discharge of records of the type with which said adapter is used. The effectiveness and reliability of the adapter is enhanced by the fact that the record supporting and discharging portion of the adapter becomes, in effect, an integral part of a tilting and nodding spindle of a phonograph turntable so that movements of said spindle are transmitted directly to said portion of the adapter. The proper function of the adapter to discharge a single record from the supported stack at each record changing cycle is assured. This is due to the fact that the records above the lowermost record are positively supported by the separator blade which comes into play in response to the force imposed by the records themselves during the tilting motion of said record supporting and dropping portion.

I claim:

1. Automatic phonograph apparatus comprising a turntable, a shelf structure mounted to the side of said turntable to support the edge portion of a stack of records and having a stop disposed for abutting engagement with the edge of the lower-most record in a supported stack, a movably mounted spindle of relatively small diameter extending upwardly from said turntable and having an offset extension providing a shoulder for supporting the center of a stack of records having a central aperture of correspondingly small diameter, an adapter of relatively large diameter placeable over and in engagement with said spindle and having an offset extension providing a shoulder for supporting the center of a stack of records having a central aperture of correspondingly large diameter, means connected with said spindle to impart movement thereto in a direction toward said shelf structure, a side piece mounted on said adapter to move inwardly and outwardly thereof, means normally urging said side piece outwardly to a position for contact with the transverse edge of the central apertured portion of the supported lowermost record, blade also mounted on said adapter to move inwardly and outwardly thereof in a path overlying said lowermost record, means normally urging said blade inwardly of said adapter, interengageable means between said spindle and said adapter to support the latter in a position where said side piece confronts said shelf structure and for movement with said motion of said spindle, and means including said side piece for moving said blade outwardly to a position for entering between said lowermost record and the record immediately above it through inward movement of said side piece in response to said tilted motion of said adapter with respect to said lowermost record in abutting engagement with said stop.

2. Automatic phonograph apparatus as set forth in claim 1, in which the means normally urging the mentioned side piece outwardly of the adapter includes a spring element and a slide member in engagement with said side piece, and in which the means normally urging the mentioned blade inwardly of said adapter is constituted by a part of said spring element.

3. Automatic phonograph apparatus comprising a turntable, a shelf structure mounted to one side of said turntable to support the edge portion of a stack of records and having a stop disposed for abutting engagement with the edge of the lowermost record in a supported stack, a movably mounted spindle of relatively small diameter extending upwardly from said turntable and having an offset extension providing a shoulder for supporting the center of a stack of records having a central aperture of correspondingly small diameter, an adapter unit of relatively large diameter placeable over said spindle and provided with a shouldered portion for supporting the center of a stack of records having a central aperture of correspondingly large diameter, said unit comprising a lower part and an upper part interconnected for movement with respect to each other, said lower part being in the form of a hollow straight cylinder frictionally engaging said turntable to rotate therewith, said upper part including said shouldered portion and being in the form of a hollow curved cylinder having an internal surface disposed to engage said shoulder of said spindle to be suspended thereby in a floating position with respect to said lower part, means connected with said spindle to impart movement thereto in a direction toward said shelf structure, said movement being transmitted directly to said upper part of said adapter unit through its engagement with said extension of said spindle, a side piece mounted on said spindle structure to move inwardly and outwardly with respect to a side thereof which faces toward said shelf structure, means normally urging said side piece outwardly to a position for contact with the transverse edge of the central apertured portion of the supported lowermost record, a blade also mounted on said adapter unit to move inwardly and outwardly thereof in a path overlying said lowermost record, means normally urging said blade inwardly of said adapter unit, and means including said side piece for moving said blade outwardly to a position for entering between said lowermost record and the record immediately above it through inward movement of said side piece in response to said tilting motion of said adapter unit with respect to said lowermost record in abutting engagement with said stop.

4. Automatic phonograph apparatus as set forth in claim 3, in which the means normally urging the mentioned side piece outwardly of the adapter unit includes a spring element and a slide member in engagement with said side piece, and in which the means normally urging the mentioned blade inwardly of said unit is constituted by a part of said element disposed in engagement with said blade.

5. Phonograph apparatus comprising a two-part arrangement for supporting and dropping centrally apertured records, one of said parts including a shelf for supporting a stack of records adjacent the outer marginal portion thereof, the other of said parts including a spindle structure having one side provided with a shoulder for supporting a stack of records adjacent the inner marginal edge portion thereof, a side piece movably carried by said spindle structure for placement in and out of a position where said side piece projects outwardly beyond another side of said spindle structure opposite to said one side thereof to engage the inner marginal edge of at least the lowermost record of a supported stack, a blade movably carried by said spindle structure for placement into and out of a position in which said blade projects between said lowermost record and the record immediately above it, instrumentalities for establishing a coupling between said side piece and said blade, said instrumentalities includng yieldable means for resiliently maintaining said side piece in its mentioned position and said blade out of its mentioned position, means for supporting said spindle structure in a position where said side piece confronts said shelf and for imparting motion to said spindle structure toward said shelf, and means for restraining the lowermost record against displacement with said motion of said spindle structure thereby causing said side piece to move out of its mentioned position, said side piece, in so moving, causing said blade to move to its mentioned position through said coupling.

6. Phonograph apparatus comprising a shelf for supporting a stack of centrally apertured records at the outer marginal portion thereof, a spindle structure spaced laterally from said shelf and provided with a shoulder for supporting the stack of records at the central portion thereof, said shoulder extending from a side of said spindle structure which faces away from said shelf, a side piece carried by said spindle structure to move inwardly and outwardly with respect to a side thereof which faces toward said shelf, a blade also carried by said spindle to move for placement in and out of a position between the supported lowermost record and the record immediately above it, spring means for normally moving said side piece outwardly to contact the inner edge of said lowermost record and for normally moving said blade to place it out of said position, means connected with said spindle structure to impart motion thereto in a direction toward said shelf, and means for engaging the outer edge of said lowermost record to restrain it against displacement with said motion of said spindle structure thereby causing said side piece to move inwardly for moving said blade to place it in said position against said spring-activated means.

7. Phonograph apparatus as set forth in claim 6, in which the mentioned spring means includes a slide member and a spring element, said slide member being disposed for engagement with the mentioned side piece and with the mentioned blade, said spring element bearing on said member for moving the same in contact with said side piece to urge the same outwardly of the spindle structure, and said spring further being disposed to engage with the mentioned blade for moving the same in contact with said side piece.

8. Phonograph apparatus comprising a turntable, a shelf mounted to one side of said turntable to support the outer edge portion of a stack of centrally apertured records, a movably mounted spindle structure extending upwardly from the center of said turntable and having a shoulder for supporting the inner edge portion of the stack of records, said shoulder extending from one side of said spindle which faces away from said shelf, a side piece mounted on said spindle structure to move inwardly and outwardly with respect to a side thereof which faces toward said shelf structure, said side piece being extended for engagement with the inner edge portion of the supported lowermost record, a blade mounted in said spindle structure to move inwardly and outwardly with respect to said one side thereof, said blade being disposed for placement in and out of a position where it projects between said lowermost record and a record immediately above it, a member mounted in said spindle structure to slide between said side piece and said blade, yieldable means engaging said member and resiliently acting thereon to slide the same in contact with said side piece to move it outwardly for engagement with the inner edge of said lowermost record, said means also engaging said blade and resiliently acting thereon to move the same inwardly for contact with said member and for placement out of the aforesaid position, means connected with said spindle structure to impart motion thereto in a direction toward said shelf structure, stop means engageable with the outer edge portion of said lowermost record for restraining the latter against movement with said motion of said spindle structure thereby imparting inward movement to said side piece and, through said member, imparting outward movement to said blade for its placement in the aforesaid position.

References Cited in the file of this patent

UNITED STATES PATENTS

| | | |
|---|---|---|
| 2,629,604 | Pifer | Feb. 24, 1953 |
| 2,676,805 | Tourtellot | Apr. 27, 1954 |

FOREIGN PATENTS

| | | |
|---|---|---|
| 251,441 | Switzerland | Aug. 2, 1948 |
| 301,013 | Switzerland | Nov. 1, 1954 |
| 698,580 | Great Britain | Oct. 21, 1953 |